United States Patent Office 3,499,910
Patented Mar. 10, 1970

3,499,910
MONOHALOPHENYLTHIAZOLYL UREAS
Patrick Robert Driscoll, Fords, N.J., assignor to Mobil Oil Corporation, a corporation of New York
No Drawing. Filed May 8, 1967, Ser. No. 636,589
Int. Cl. C07d 91/34; A01n 9/22
U.S. Cl. 260—306.8            1 Claim

ABSTRACT OF THE DISCLOSURE

Monohalophenylthiazolyl ureas are new compounds that are effective for the control of plant parasitic nematodes and are not phytotoxic to plants. A particularly effective material is 1-methyl-3-[4-(p-chlorophenyl)-2-thiazolyl] urea.

BACKGROUND OF THE INVENTION

Field of the invention

This invention relates to the control of plant-parasitic nematodes. It is more particularly concerned with certain thiazolyl ureas and their use in controlling nematodes.

DESCRIPTION OF THE PRIOR ART

The use of chemicals for nematode control is a comparatively recent development. In view of the complex structure of the nematode, experimental approaches which could lead to effective toxicants have been difficult. The nematodes, as well as the egg thereof, is protected by a difficulty permeable membrane, and the effective toxicant must have the ability to penetrate this membrane and the ability to kill. Toxicants must also be readily dispersible in soils or other environment of the organism and be stable therein. Since the reason for ridding soils of nematode infestations is to provide a beneficial growing media for plants, the nematocide must be non-phytotoxic to plants, or its phytotoxicity must be short-lived. A phytotoxic nematocide, either itself or some decomposition product of it, should be such that, prior to crop planting, it is removed from the soil by evaporation, by rain washing, or by soil bacterial action.

Various chemicals have been proposed for the control of nematocides. For example contact nematocides have been developed from certain phosphorous esters (U.S. 3,112,244). Insofar as is now known, urea derivatives have not been proposed as nematocides.

SUMMARY OF THE INVENTION

This invention provides the compound having the formula:

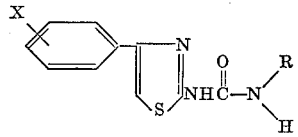

wherein $x$ is halogen and R is lower alkyl ($C_1$–$C_4$).

The invention also provides a method for the control of soil-borne nematodes which comprises contacting said soil with a nematocidal amount of the aforedefined compound.

DESCRIPTION OF SPECIFIC EMBODIMENTS

The compounds utilizable in accordance with this invention are compounds having the structure

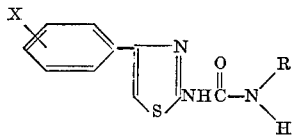

wherein $x$ is halogen and R is lower alkyl ($C_1$–$C_4$). Non-limiting examples of the compounds of this invention are:

1-methyl-3-[4-(p-chlorophenyl)-2-thiazolyl] urea,
1-methyl-3-[4-(o-chlorophenyl)-2-thiazolyl] urea,
1-methyl-3-[4-(m-chlorophenyl)-2-thiazolyl] urea,
1-methyl-3-[4-(p-bromophenyl)-2-thiazolyl] urea,
1-isobutyl-3-[4-(p-bromophenyl)-2-thiazolyl] urea,
1-isobutyl-3-[4-(p-chlorophenyl)-2-thiazolyl] urea,
1-propyl-3-[4-(p-chlorophenyl)-2-thiazolyl] urea,
1-methyl-3-[4-(o-iodophenyl)-2-thiazolyl] urea,
1-methyl-3-[4-(m-iodophenyl)-2-thiazolyl] urea,
1-methyl-3-[4-(m-bromophenyl)-2-thiazolyl] urea, and
1-ethyl-3-[4-(p-chlorophenyl)-2-thiazolyl] urea.

These compounds can be prepared by several methods known in the art, but it must be strictly understood that this invention is not limited by the manner in which the compounds are prepared. As is demonstrated in the specific examples a feasible method is first to react a ring-halogenated acetophenone, thiourea and iodine to obtain a 2-amino-4-halophenyl thiazole. This is then reacted with methyl isocyanate to produce the thiazolyl urea.

In carrying out the method of this invention for controlling nematodes the chemicals of this invention can be applied in various ways. They are usually applied to the soil as the toxic components in a nematocidal composition comprising a nematocidal amount of the nematocide and a carrier for a nematocide. Such compositions can be applied as dust or as liquid sprays. In addition to the carrier they can contain additives such as emulsifying agents, wetting agents, binding agents, odorants and stabilizers. Liquid and solid carriers known for nematocides include water, organic solvents, mineral oils, clays, and ground walnut sheels.

The exact quantity of the compounds of this invention to be utilized in nematocidal compositions will be found to vary somewhat. It depends to some extent on the type of composition in which the material is being employed, the method of application and the severity of the condition to be controlled. In practice nematocidal application is measured in terms of pounds of nematocide applied per acre. The compounds of this invention are effective when applied in nematocidal amounts, i.e., at rates between about one pound and about 20 pounds per acre, preferably at about 3 to 10 pounds per acre.

Application of the chemicals of this invention to food-crop land prior to planting is preferable, one reason being that it is less difficult to treat a field wherein no crops are growing. Prior treatment can in no way reduce the length of the growing season, for the chemicals are not phytotoxic when used in nematocidal amounts. Crops can, therefore, be planted immediately after treatment if desired. This is very important, especially in some zones wherein the growing season is relatively short and any method for nematode control which tends to shorten the growing season cannot be tolerated.

EXAMPLE 1

2-amino-4-(p-chlorophenyl) thiazole p-Chloroacetophenone (40.0 g., 0.26 mole), thiourea (39.3 g., 0.52 mole) and iodine (65.8 g., 0.26 mole) were mixed together and heated on a steam bath for 16 hours. The mixture was cooled, washed well with ether and filtered. The crude solid was slurried with 600 ml. of hot water and neutralized with concentrated NH$_4$OH. The neutralized solid was filtered and recrystallized from ethanol, M.P. 160–64°.

Analysis.—Calc'd (percent): C, 51.30; H, 3.35; N, 13.30. Found (percent): C, 51.55; H, 3.68; N, 13.02.

EXAMPLE 2

1-methyl-3-[4-(p-chlorophenyl)-2-thiazolyl] urea 2-amino-4-(p-chlorophenyl) thiazole (10.5 g., 0.05 mole) was dissolved in pyridine (50 ml.) in a pressure bottle. There was added methyl isocyanate (3.0 g., 0.053 mole) and dimethylaniline (2 drops). The bottle was heated in a steam bath for 16 hours. The solvent was removed by distillation and the solid residue recrystallized from ethanol. Solid crystals obtained. Wt. 7.53 g., M.P. 209–211°. Second crop obtained by concentrating mother liquor Wt. 2.0 g. Total wt. 9.53 g. Yield 71.4%.

*Analysis.*—Calc'd (percent): C, 49.35; H, 3.77. Found (percent): C, 47.84; H, 3.78.

NEMATOCIDAL TEST

Method of rearing root-knot nematodes

Root-knot nematode (*Meloidogyne incognita*) cultures are maintained in the greenhouse in 7″ clay pots using tomato, var. Rutgers, as the host plant. Two 8-week old pots of infested soil are used to inoculate 72 three-inch pots of noninfested soil in the cement mixer for 10 minutes. Two 7″ pots of this mixture are returned to the greenhouse for future tests.

Method of treatment

One hundred mg. of test compound is weighed on the analytical balance and formulated using 1 ml. of Tween 20, 9 ml. of acetone and 90 ml. of water. Four ml. and 81 ml. aliquots are diluted to 50 ml. with water for the 10 and 20 lb. active per acre rates. The 50 ml. of formulation is poured over soil sufficient for three 3″ pots, stirred into the soil with a hand fork and placed in the pots. The pots are buried to the lip in the greenhouse sand bench. After 24 hours, 5 cucumber seeds, variety Early Fortune, are planted in each pot.

Method of recording results

After 4 weeks, the plants are rated for phytotoxicity and the roots removed from the pots and rated for root-knot control based on the degree of root galling.

The compound of example 2 was subjected to the nematocidal test at application rates of 20 and of 10 pounds per acre. At 20 pounds per acre 100% control was achieved. At 10 pounds per acre 90% control was achieved. At both dosages this material was not phytotoxic.

Although the present invention has been described with preferred embodiments, it is to be understood that modifications and variations may be restorted to, without departing from the spirit and scope of this invention, as those skilled in the art will readily understand.

What is claimed is:
1. 1-methyl-3-[4-(p-chlorophenyl)-2-thiazolyl] urea.

References Cited

Beyer et al., Chem. Abstracts, vol. 65, col. 18572c, Dec. 5, 1966.

ALEX MAZEL, Primary Examiner

R. J. GALLAGHER, Assistant Examiner

U.S. Cl. X.R.

424—270

PO-1050 (5/69)

UNITED STATES PATENT OFFICE
CERTIFICATE OF CORRECTION

Patent No. 3,499,910          Dated March 10, 1970

Inventor(s) PATRICK ROBERT DRISCOLL

It is certified that error appears in the above-identified patent and that said Letters Patent are hereby corrected as shown below:

Col. 3, Line 30, "81 ml" should be --8 ml--

SIGNED AND SEALED
JUL 14 1970

(SEAL)
Attest:

Edward M. Fletcher, Jr.
Attesting Officer

WILLIAM E. SCHUYLER, JR.
Commissioner of Patents